United States Patent
Guo et al.

(10) Patent No.: US 11,549,042 B2
(45) Date of Patent: Jan. 10, 2023

(54) ENVIRONMENTALLY FRIENDLY NEAR-AZEOTROPIC MIXED REFRIGERANT

(71) Applicants: ZHEJIANG LANTIAN ENVIRONMENTAL PROTECTION HI-TECH CO., LTD., Hangzhou (CN); SINOCHEM LANTIAN CO., LTD., Hangzhou (CN)

(72) Inventors: Zhikai Guo, Zhejiang (CN); Pinzan Xie, Zhejiang (CN); Xiaoqing Fang, Zhejiang (CN)

(73) Assignees: ZHEJIANG LANTIAN ENVIRONMENTAL PROTECTION HI-TECH CO., LTD., Hangzhou (CN); SINOCHEM LANTIAN CO., LTD., Hangzhou (CN)

(*) Notice: Subject to any disclaimer, the term of this patent is extended or adjusted under 35 U.S.C. 154(b) by 0 days.

(21) Appl. No.: 17/466,812

(22) Filed: Sep. 3, 2021

(65) Prior Publication Data
US 2021/0395591 A1    Dec. 23, 2021

Related U.S. Application Data

(60) Continuation of application No. 16/924,894, filed on Jul. 9, 2020, now Pat. No. 11,136,483, which is a division of application No. 16/216,339, filed on Dec. 11, 2018, now Pat. No. 10,752,819, which is a division of application No. 14/899,944, filed as application No. PCT/CN2014/080384 on Jun. 20, 2014, now abandoned.

(30) Foreign Application Priority Data

Jul. 5, 2013  (CN) .......................... 201310282218.6

(51) Int. Cl.
C09K 5/04    (2006.01)

(52) U.S. Cl.
CPC .......... *C09K 5/045* (2013.01); *C09K 2205/11* (2013.01); *C09K 2205/112* (2013.01); *C09K 2205/12* (2013.01); *C09K 2205/122* (2013.01); *C09K 2205/126* (2013.01); *C09K 2205/22* (2013.01); *C09K 2205/32* (2013.01)

(58) Field of Classification Search
CPC .............. C09K 5/045; C09K 2205/126; C09K 2205/22; C09K 2205/112; C09K 2205/32
See application file for complete search history.

(56) References Cited

U.S. PATENT DOCUMENTS

| | | | |
|---|---|---|---|
| 2006/0243944 A1 | 11/2006 | Minor | |
| 2010/0025619 A1 | 2/2010 | Riva | |
| 2014/0135241 A1 | 5/2014 | Matsumoto | |
| 2016/0108762 A1* | 4/2016 | Mahmoud | ............. F22B 27/165 60/671 |

FOREIGN PATENT DOCUMENTS

| | | |
|---|---|---|
| CN | 1285699 C | 6/2005 |
| CN | 101297016 A | 10/2008 |
| CN | 101671542 | 3/2010 |
| CN | 101747867 A | 6/2010 |
| CN | 101864277 A | 10/2010 |
| CN | 1285699 A | 2/2011 |
| CN | 102066518 A | 5/2011 |
| CN | 102083935 A | 6/2011 |
| CN | 102215917 A | 10/2011 |
| CN | 102216411 A | 10/2011 |
| CN | 102703033 A | 10/2012 |
| CN | 102712837 A | 10/2012 |
| WO | WO2010/059677 | 5/2010 |

OTHER PUBLICATIONS

He, Mao gang et al., "Thermodynamic analysis of the fluorether alternative refrigerants", Journal of Engineering Thermophysics, Mar. 31, 20122, vol. 31, No. 2, pp. 145-147.
EPO Written Opinion, EP3018184, dated Jun. 2016.

\* cited by examiner

*Primary Examiner* — John R Hardee
(74) *Attorney, Agent, or Firm* — Muncy, Geissler, Olds & Lowe, P.C.

(57) ABSTRACT

Disclosed is an environmentally friendly near-azeotropic mixed refrigerant, consisting essentially of HFO-1234 yf, HFE-143a and a third component, with the mass percentage of each component being: 70%-98% of HFO-1234yf, 1%-15% of HFE-143a and 1%-15% of the third component. The refrigerant of the present invention is environmentally friendly, excellent in thermodynamic properties, can directly realize drop-in substitution in an original system using HFC-134a without changing any parts, and can be used as a long term alternative to HFC-134a.

8 Claims, No Drawings

ENVIRONMENTALLY FRIENDLY NEAR-AZEOTROPIC MIXED REFRIGERANT

CROSS REFERENCE TO RELATED APPLICATIONS

This application is a Continuation Application of U.S. patent application Ser. No. 16/924,894, filed Jul. 9, 2020, now U.S. Pat. No. 11,136,483, which is a Divisional Application of U.S. patent application Ser. No. 16/216,339, filed Dec. 11, 2018, now U.S. Pat. No. 10,752,819, which is a Divisional Application of U.S. application Ser. No. 14/899,944, filed on Dec. 18, 2015, now abandoned, which is a national stage application of PCT/CN2014/080384 filed Jun. 20, 2014 and Chinese Patent Application No. 201310282218.6, filed Jul. 5, 2013, the entirety of all of which are incorporated by reference herein.

FIELD OF THE INVENTION

The present invention relates to a mixed refrigerant, in particular, to a refrigerant composition with extremely low greenhouse effect that can directly be used as an alternative of HFC-134a without damage to the ozone layer.

BACKGROUND OF THE INVENTION 1, 1, 1, 2-tetrafluoroethane (HFC-134a), as an alternative to CFC-12, has been widely used with its excellent performance. However, due to its high value of GWP up to 1430, it has been listed in one of the refrigerants with high GWP that are firstly eliminated in "Kyoto Protocol". For HFC-134a used in the small refrigeration equipments, most of them have been substituted by HC-600a, while for the alternative to HFC-134a used in the industrial and commercial refrigeration and air-conditioning in cars, it has become a hot issue to be resolved urgently across the world.

At present, internationally, the main alternatives to HFC-134a are carbon dioxide ($CO_2$), 1, 1-difluoroethane (HFC-152a), 2, 3, 3, 3-tetrafluoropropene (HFO-1234yf), etc. But they have their advantages and disadvantages. $CO_2$ is environmentally friendly and non-combustible, but the system pressure is high, the energy efficiency is low, and the system should be re-designed with high costs. HFC-152a has a high energy efficient and low price of refrigerant, but its flammability is strong and it is necessary to add secondary loop, which causes a high costs. HFO-1234yf has low flammability, small system transformation but its energy inefficient is low and the cooling capacity is low. Therefore, the studies on the alternative to HFC-134a have been continuously carried out in various countries across the world, and mixed refrigerant is a major research field.

In the prior art, Patent Document CN1285699C (200410084844.5) discloses a ternary composition composed of fluoroethane (HFC-161), 1, 1-difluoroethane (HFC-152a) and 1, 1, 1, 2-tetrafluoroethane; CN101671542A (200910018489.4) discloses a mixture composed of 2, 3, 3, 3-tetrafluoropropene (HFO-1234yf), 1, 1-difluoroethane (HFC-152a) and isobutene; CN101864277A (201010196224. 6) discloses a mixture composed of 2, 3, 3, 3-tetrafluoropropene (HFC-1234yf), 1, 1-difluoroethane (HFC-152a) and dimethyl ether (DME); CN102703033A (201210165277.0) discloses a mixture composed of 2, 3, 3, 3-tetrafluoropropene (HFC-1234yf), 1, 1, 1, 2-tetrafluoroethane (HFC-134a) and dimethyl ether (DME); CN102066518A (200980122002. 5) discloses a mixture composed of 2, 3, 3, 3-tetrafluoropropene (HFC-1234yf), 1,1,1,2-tetrafluoroethane (HFC-134a) and 1, 1-difluoroethane (HFC-152a); CN102083935A (200980125796. 0) discloses a mixture composed of 1, 1, 1, 2-tetrafluoroethane (HFC-134a) and 2, 3, 3, 3-tetrafluoropropene (HFC-1234yf). CN102083935A (200980125796. 0) discloses a mixture composed of 1, 1, 1, 2-tetrafluoroethane firing (HFC-134a) and 2, 3, 3, 3-tetrafluoropropene (HFC-1234yf); and CN102712837A (201080038152. 0) discloses a mixture composed of 1, 1, 1, 2-tetrafluoroethane (HFC-134a), 2, 3, 3, 3-tetrafluoropropene (HFC-1234yf) and difluoromethane (HFC-32).

The refrigerant compositions disclosed in the above patents have such drawbacks as high GWP value, strong flammability, high temperature glide, low efficiency, small volume of cooling capacity, unable to be directly filled and used in HFC-134a system, etc. Therefore, it is necessary to develop an alternative refrigerant of HFC-134a with excellent cooling performance, better compatibility with existing systems, and better environmental performance.

SUMMARY OF THE INVENTION

The object of the present invention is to provide an environmentally friendly near-azeotropic mixed refrigerant, which have more excellent environmental performance and use performance than HFC-134a. It can be used an alternative, low-cost refrigerant in the system using HFC-134a without changing any parts.

In order to achieve the above object, the present invention adopts the following technical solutions.

An environmentally friendly near-azeotropic mixed refrigerant essentially includes 2, 3, 3, 3-tetrafluoropropene (HFO-1234yf), trifluoro methyl ether ($CF_3OCH_3$, HFE-143a) and a third component, wherein the third component is selected from one or two or more of fluoroethane (HFC-161), 1, 1, 1, 2-tetrafluoroethane (HFC-134a), difluoromethane (HFC-32), dimethyl ether ($CH_3OCH_3$, HFE-170), propane (HC-290), cyclopropane (C270) and their mass percentages of all components are as follows:

HFO-1234yf: 70%-98%;
HFE-143a: 1%-15%;
The third component: 1%-15%.

When a third component is used for preparing the near-azeotropic refrigerant as stated in the invention, any one or two or more than three of them can be selected as the third component from fluoroethane (HFC-161), 1, 1, 1, 2-tetrafluoroethane (HFC-134a), difluoromethane (HFC-32), dimethyl ether ($CH_3OCH_3$, HFE-170), propane (HC-290) and cyclopropane (C270), and when more than two substances are selected as the third component, the mixed ratio is not specified.

For the environmentally friendly near-azeotropic mixed refrigerant in the invention, the preferred mass percentage of various components is as follows:

HFO-1234yf: 75%-94%;
HFE-143a: 5%-15%;
The third component: 1%-10%.

For the environmentally friendly near-azeotropic mixed refrigerant in the invention, further, preferably the mass percentage of various components is as follows:

HFO-1234yf: 85%-94%;
HFE-143a: 5%-10%;
The third component: 1%-5%.

Preferably, the temperature glide of the environmentally friendly near-azeotropic mixed refrigerant in the invention is less than 1° C. and the GWP value is less than 150. The present invention provides an environmentally friendly near-azeotropic mixed refrigerant suitable for alternative of HFC-134a, especially suitable for the alternative of HFC-134a in automotive air conditioning. When it is used as alternative of HFC-134a in automotive air conditioning, the automotive air conditioning system need not change any part and the mixed refrigerant can be directly filled to replace HFC-134a. Compared with prior art, the environmentally friendly near-azeotropic mixed refrigerant in the invention has the following advantages:

(1) Environmental performance is superior to HFC-134a, the ozone-depleting potential ODP value is zero, and the global warming potential (GWP) value is dramatically reduced compared with HFC-134a;

(2) It is safe in use, with low flammability;

(3) The evaporating pressure, condensing pressure and pressure ratio, etc. are quite equivalent to HFC-134a, and the cooling capacity per unit volume is higher than HFC-134a, with less temperature glide. The COP value is greater than HFC-134a, with low exhaust gas temperature, and excellent performance;

(4) Without changing any part of the equipment, the refrigerant can be used in a system originally using HFC-134a. It is compatible with the piping components of the originally used HFC-134a refrigeration system, and it can reduce the amount of filling, improve energy efficiency, save resources and energy.

DETAILED DESCRIPTION OF THE EMBODIMENTS

In the present invention, the refrigerant is prepared through physically mixing of 2, 3, 3, 3-tetrafluoropropene (HFO-1234yf), trifluoro methyl ether ($CF_3OCH_3$, HFE-143a) and one, two or three or more from fluoroethane (HFC-161), 1, 1, 1, 2-tetrafluoroethane (HFC-134a), difluoromethane (HFC-32), dimethyl ether ($CH_3OCH_3$, HFE-170), propane (HC-290), cyclopropane (C270) according to appropriate mixing ratios under the liquid state.

The said 2, 3, 3, 3-tetrafluoropropene (HFO-1234yf) has a molecular formula $CH_2CFCF_3$, with a molecular weight of 114.04, standard boiling point of −29.35° C., critical temperature of 94.7° C., critical pressure of 3. 38 MPa, and GWP value of 4. The said trifluoro methyl ether ($CF_3OCH_3$, HFE-143a) has a molecular formula $CF_3OCH_3$, with a molecular weight of 100.04, standard boiling point of −24.0° C., critical temperature of 104.8° C., critical pressure of 3.59 MPa, and GWP value of 750. The said fluoroethane (HFC-161) has a molecular formula $CH_3CH_2F$, with a molecular weight of 48.06, standard boiling point of −37.1° C., critical temperature of 102. 2° C., critical pressure of 4. 7 Mpa, and GWP value of 12.

The said difluoromethane (HFC-32) has a molecular formula $CH_2F_2$, with a molecular weight 52.02, standard boiling point of −51. 7° C., critical temperature of 78.2° C., critical pressure of 5.78 MPa, and GWP value of 675.

The said 1, 1, 1, 2-tetrafluoroethane (HFC-134a) has a molecular formula $CH_2FCF_3$, with a molecular weight of 102.03, standard boiling point of −26.1° C., critical temperature of 101. 1° C., critical pressure of 4.06 MPa, and GWP value of 1430. The said dimethyl ether (HFE-170) has a molecular formula $CH_3OCH_3$, with a molecular weight of 46.07, standard boiling point of −24. 8° C., critical temperature of 127. 2° C., critical pressure of 5. 34 MPa, and GWP value of about 1. The said propane (HC-290) has a molecular formula $CH_3CH_2CH_3$, with a molecular weight of 44.10, standard boiling point of −42.1° C., critical temperature of 96.7° C., critical pressure of 4.25 MPa and GWP value of about 20.

The said cyclopropane (C-270) has a molecular formula $CH_2CH_2CH_2$, with a molecular weight of 42.08, standard boiling point of −31.5° C., critical temperature of 125. 2° C., critical pressure of 5.58 MPa, and GWP value of about 20.

The following examples are illustrative of several embodiments of the present invention, but the invention is not limited to these specific embodiments. Technicians skilled in the art should be aware that the present invention encompasses all options, modifications and equivalents as specified in the claims.

Example 1

Physically mix HFO-1234yf, HFE-143a and C270 in the liquid phase according to a ratio of 70:15:15 (by mass percentage).

Example 2

Physically mix HFO-1234yf, HFE-143a and E170 in the liquid phase according to a ratio of 75:15:10 (by mass percentage).

Example 3

Physically mix HFO-1234yf, HFE-143a and R134a in the liquid phase according to a ratio of 80:10:5 (by mass percentage).

Example 4

Physically mix HFO-1234yf, HFE-143a and R290 in the liquid phase according to a ratio of 90:5:5 (by mass percentage).

Example 5

Physically mix HFO-1234yf, HFE-143a and R161 in the liquid phase according to a ratio of 94:1:5 (by mass percentage).

Example 6

Physically mix HFO-1234yf, HFE-143a and R32 in the liquid phase according to a ratio of 98:1:1 (by mass percentage).

The features and effects of the invention are described by comparing the performance of above embodiment with HFC-134a.

1. Environmental Performance

The environmental performance of above embodiment is compared with that of HFC-134a, as shown in table 1. For the ODP value, the value of CFC-11 is used as the reference value 1. 0, for the GWP value, the value of $CO_2$ is used as the reference value 1. 0 (100 years).

TABLE 1

| Environmental performance | | |
|---|---|---|
| Working medium | ODP | GWP |
| Example 1 | 0 | 120 |
| Example 2 | 0 | 115 |
| Example 3 | 0 | 150 |

TABLE 1-continued

Environmental performance

| Working medium | ODP | GWP |
|---|---|---|
| Example 4 | 0 | 40 |
| Example 5 | 0 | 15 |
| Example 6 | 0 | 20 |
| HFC-134a | 0 | 1430 |

As shown from above table 1, the ODP value of the above embodiments is zero and the value of global warming potential (GWP) is 15~150, all less than that of HFC-134a and in line with EU MAC Directive (GWP value: no greater than 150). Its impact on the environment is much less than HFC-134a, and the environmental performance is excellent, and it can be used as a long term alternative of HFC-134a.

2. Temperature Glide

TABLE 2

Temperature glide table

| Working medium | Bubble point temperature (° C.) | Dew point temperature (° C.) | Temperature glide |
|---|---|---|---|
| Example 1 | −31.30 | −31.04 | 0.26 |
| Example 2 | −29.79 | −29.71 | 0.08 |
| Example 3 | −30.53 | −30.46 | 0.07 |
| Example 4 | −31.91 | −31.08 | 0.83 |
| Example 5 | −31.65 | −30.84 | 0.81 |
| Example 6 | −32.28 | −30.03 | 2.25 |

As shown from above table, except for the Example 6, the temperature glide is less than 1° C., showing it is near-azeotropic mixture, facilitating the stable operation of the system.

3. Thermal Parameters and Thermodynamic Properties

Under the automotive air conditioning conditions (ie, evaporation temperature=−1.0° C., condensing temperature=62.0° C., intake air temperature=9° C., supercooled temperature=57° C.), the thermal parameters (i.e. evaporation pressure $P_0$, condensing pressure $P_k$, pressure ratio $P_k/P_0$, exhaust temperature $t_2$) and relative heat capacity (i.e. relative COP, the relative heat capacity per unit mass $q_0$, relative heating capacity per unit volume $q_v$, and relative power consumption per unit volume $w_v$) of above embodiments and HFC-134a are shown in table 3.

The above relative thermodynamic property refers to the ratio of thermodynamic property of various embodiments to that of HFC-134a, and the relative density refers to the relative density of the liquid at 25° C.

As shown from table 3, under the automotive air conditioning conditions, the condensing pressure of above embodiment is equivalent to that of HFC-134a, but the pressure ratio and exhaust temperature are lower than those of HFC-134a, which can be directly filled in the original system using HFC-134a. The density of above embodiment is lower than that of HFC-134a, which can reduce the filing amount of working medium. The volumetric cooling capacity of above embodiment is higher than that of HFC-134a, having the energy-saving effect.

The invention claimed is:

1. An environmentally friendly near-azeotropic mixed refrigerant essentially comprises HFO-1234yf, HFE-143a and a third component, wherein the third component is HFE-170, and their mass percentages of all components are as follows:
   HFO-1234yf: 70%-98%;
   HFE-143a: 1%-15%;
   The third component: 1%-15%.

2. The environmentally friendly near-azeotropic mixed refrigerant according to claim 1, wherein the mass percentages of various components are as follows:
   HFO-1234yf: 75%-94%;
   HFE-143a: 5%-15%;
   The third component: 1%-10%.

3. The environmentally friendly near-azeotropic mixed refrigerant according to claim 1, wherein the mass percentages of various components are as follows:
   HFO-1234yf: 85%-94%;
   HFE-143a: 5%-10%;
   The third component: 1%-5%.

4. The environmentally friendly near-azeotropic mixed refrigerant according to claim 1, wherein the temperature glide of the refrigerant is less than 1° C.

5. The environmentally friendly near-azeotropic mixed refrigerant according to claim 1, wherein the GWP value of the refrigerant is less than 150.

6. The environmentally friendly near-azeotropic mixed refrigerant according to claim 5, wherein the refrigerant is used as an alternative of HFC-134a in the automotive air conditioning.

7. The environmentally friendly near-azeotropic mixed refrigerant according to claim 1, wherein the refrigerant is used as an alternative of HFC-134a.

8. The environmentally friendly near-azeotropic mixed refrigerant according to claim 7, wherein the automotive air conditioning system need not change any part and the mixed refrigerant can be directly filled as an alternative of HFC-134a.

\* \* \* \* \*

TABLE 3

Comparison of thermal parameters and thermodynamic properties

| Parameters Unit | $P_0$ MPa | $P_k$ MPa | $P_k/P_0$ | $t_2$ ° C. | Relative COP/ | Relative $q_0$/ | Relative $q_k$/ | Relative density/ |
|---|---|---|---|---|---|---|---|---|
| Example 1 | 0.3251 | 1.7896 | 5.50 | 75.3 | 1.07 | 1.12 | 1.07 | 0.82 |
| Example 2 | 0.3101 | 1.7530 | 5.56 | 73.1 | 1.05 | 1.02 | 1.01 | 0.86 |
| Example 3 | 0.3194 | 1.7992 | 5.63 | 70.2 | 1.01 | 0.81 | 1.02 | 0.90 |
| Example 4 | 0.3277 | 1.8037 | 5.50 | 69.4 | 1.01 | 0.83 | 1.04 | 0.85 |
| Example 5 | 0.3264 | 1.8121 | 5.55 | 69.4 | 1.01 | 0.80 | 1.04 | 0.88 |
| Example 6 | 0.3230 | 1.7844 | 5.52 | 67.9 | 1.01 | 0.74 | 1.01 | 0.90 |
| HFC-134a | 0.2823 | 1.7628 | 6.24 | 77.4 | 1 | 1 | 1 | 1 |